US006483503B1

(12) United States Patent
Spannaus et al.

(10) Patent No.: US 6,483,503 B1
(45) Date of Patent: Nov. 19, 2002

(54) PIXEL DATA MERGING APPARATUS AND METHOD THEREFOR

(75) Inventors: John Fred Spannaus, Austin, TX (US); John Alvin Voltin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/343,447

(22) Filed: Jun. 30, 1999

(51) Int. Cl.$^7$ ................................. G09G 5/00
(52) U.S. Cl. ..................... 345/213; 345/546; 345/629
(58) Field of Search .................... 345/204–213, 345/3.3, 660, 601, 545–547, 555, 556, 605, 629, 698–699; 711/101, 154; 348/584–585

(56) References Cited

U.S. PATENT DOCUMENTS

| | | | |
|---|---|---|---|
| 4,658,247 A | | 4/1987 | Gharachorloo |
| 5,309,173 A | * | 5/1994 | Izzi et al. ............... 345/545 |
| 5,321,805 A | | 6/1994 | Hayman et al. |
| 5,761,401 A | | 6/1998 | Kobayashi et al. |
| 5,890,190 A | * | 3/1999 | Rutman ............... 711/101 |
| 5,894,300 A | * | 4/1999 | Takizawa ............... 345/601 |
| 6,014,125 A | * | 1/2000 | Herbert ............... 345/660 |

FOREIGN PATENT DOCUMENTS

EP  0 597 218 A1  5/1994

* cited by examiner

Primary Examiner—Steven Saras
Assistant Examiner—Amr Awad
(74) Attorney, Agent, or Firm—Barry S. Newberger; Winstead Sechrest & Minick P.C.; Leslie A. Van Leeuwen

(57) ABSTRACT

A pixel merge apparatus and method has been implemented. Included is a configurable graphics device, which may serve as a standalone graphics engine, or as a master or slave in a master/slave configuration. In stand alone mode, the mechanism drives a display device with native pixel data. A device configured in master mode is operable for receiving pixel data from a corresponding slave device, and merging the slave pixel data with native pixel data generated by a rasterizer within the ASIC. Data is communicated between slave and master using a digital data link which may also serve to drive a flat panel display in standalone mode. A FIFO, active in the master, mediates the transfer of the slave pixel data and permits switching between native and slave pixel data with signal pixel resolution. Pixel data may be merged on a frame-by-frame basis, or in split frame mode wherein a first portion of the graphic shown on a display device constitutes native pixels generated in the rasterizer corresponding to the master device, and a second portion of the displayed graphic includes pixels generated by the rasterizer in the slave device.

37 Claims, 8 Drawing Sheets

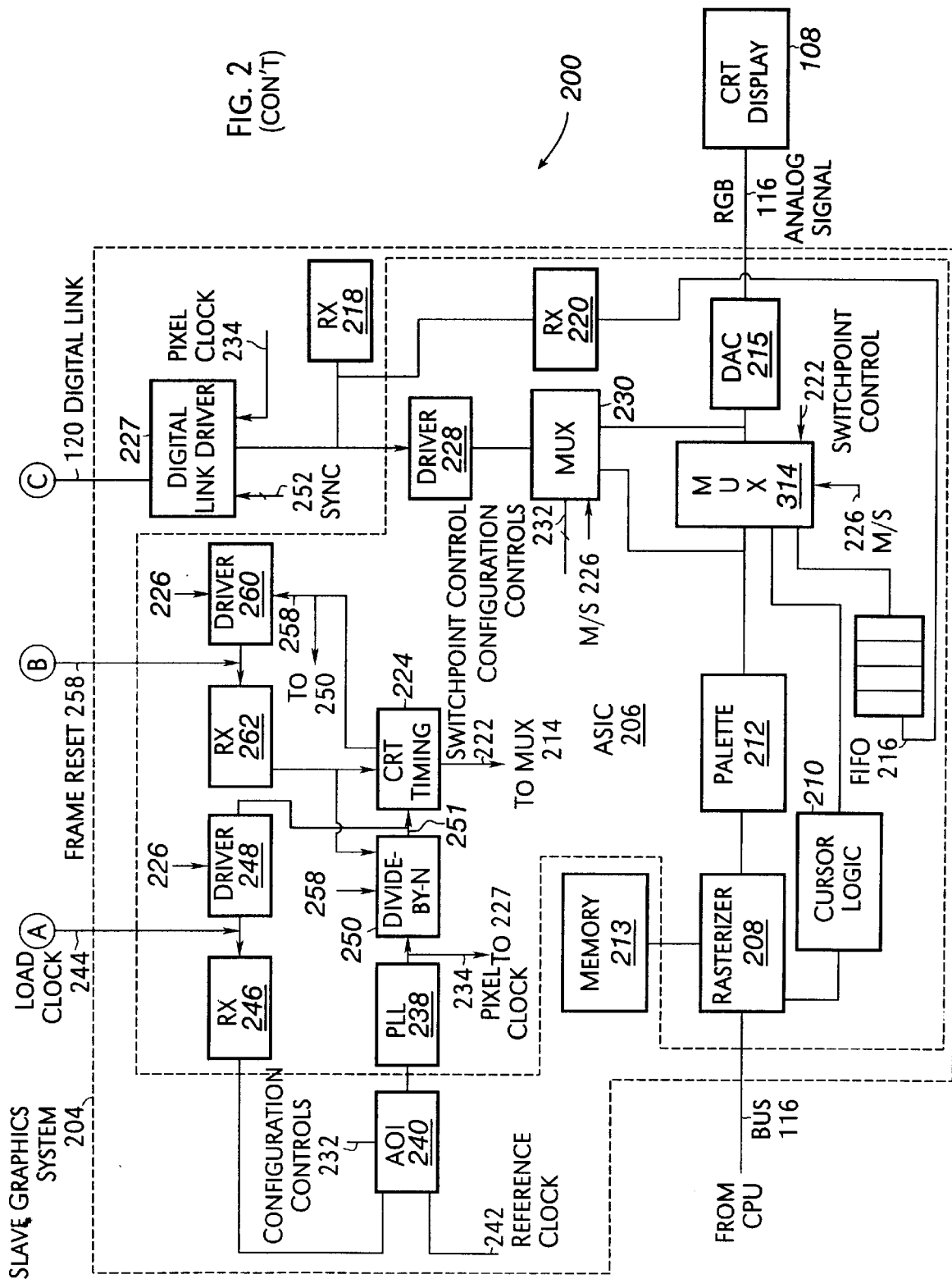
FIG. 2 (CON'T)

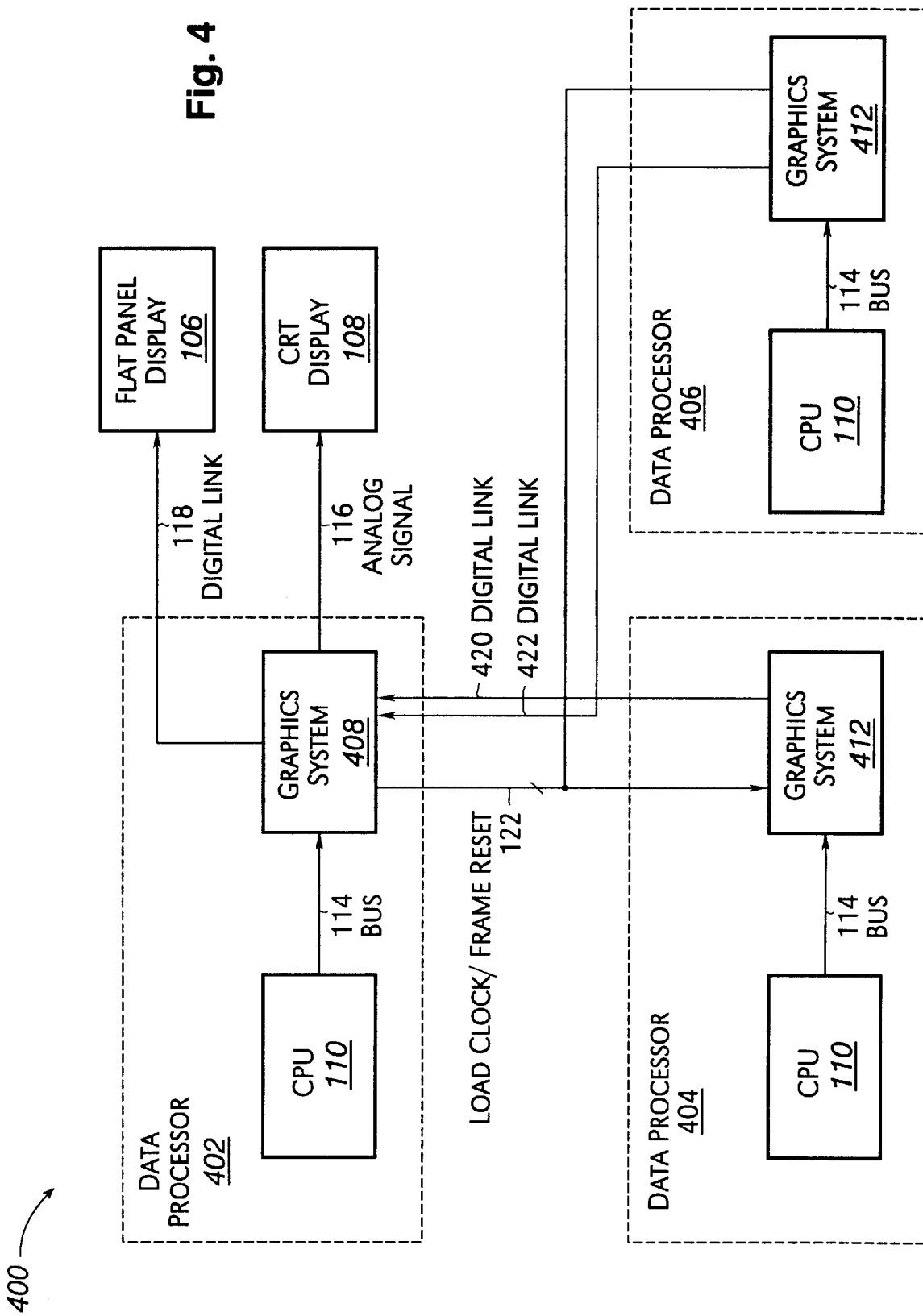

PIXEL DATA MERGING APPARATUS AND METHOD THEREFOR

TECHNICAL FIELD

The present invention relates in general to data processing systems, and in particular, to graphics rendering in a data processing system.

BACKGROUND INFORMATION

Sophisticated graphics applications in modern data processing systems require the graphics data processing hardware to generate larger and more complex images. For example, virtual reality applications may display a panoramic view of a scene, requiring a display of a plurality of component images to form a composite image. Each image in the composite may, itself, be complex, requiring a dedicated processor to compute the component image. The composite may then be generated by providing each of the component images to an end station processor that generates a composite therefrom. Dedicating a data processing system to generate the composite also adds cost to the overall system. Additionally, the display of the scene may require multiple display devices, driven by a display driver associated with the processor generating the composite image to be displayed on the corresponding display device. This increases the cost of the system even further. Thus, there is a need in the art for a mechanism to combine graphics data streams to form a composite graphics signal to be provided to a display device and that may be incorporated in a data processing system economically and with a reduced development schedule.

SUMMARY OF THE INVENTION

The aforementioned need is addressed by the present invention. Accordingly, there is provided, in a first form, an apparatus for merging pixel data. The apparatus includes a buffer operable for receiving pixel data from a first source, and first selection circuitry operable for receiving pixel data from the buffer and pixel data from a second source. The selection circuitry selects for outputting the pixel data from the buffer and pixel data received from the second source, and the selection circuitry is operable for outputting the pixel data to a display device. The buffer outputs the pixel data in response to a first clock signal.

There is also provided, in a second form, a method of merging pixel data. The method receives pixel data from first and second sources and loads the pixel data from the second source in a buffer. The method further selects for outputting, in response to a dynamic switch signal, the pixel data from the first source and the pixel data stored in the buffer. The buffer outputs the stored pixel data in response to a first clock signal from the second source.

There is also provided, in a third form, a data processing system. The data processing system includes a central processing unit (CPU) and a graphics system operable for receiving graphics data signals and control signals from the CPU. The graphics system includes a buffer operable for receiving pixel data from a first graphics engine. The graphics system also includes a second graphics engine operable for generating pixel data in response to the graphics data signals and first selection circuitry operable for receiving pixel data from the buffer and the pixel data from the second graphics engine, wherein the selection circuitry selects for outputting the pixel data from the buffer and pixel data received from the second graphics engine, the selection circuitry being operable for outputting the pixel data to a display device, and wherein the buffer outputs the pixel data in response to a first clock signal from the second graphics engine.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 illustrates, in block diagram form, a data processing system in accordance with another embodiment of the present invention;

DETAILED DESCRIPTION

Figure 1:
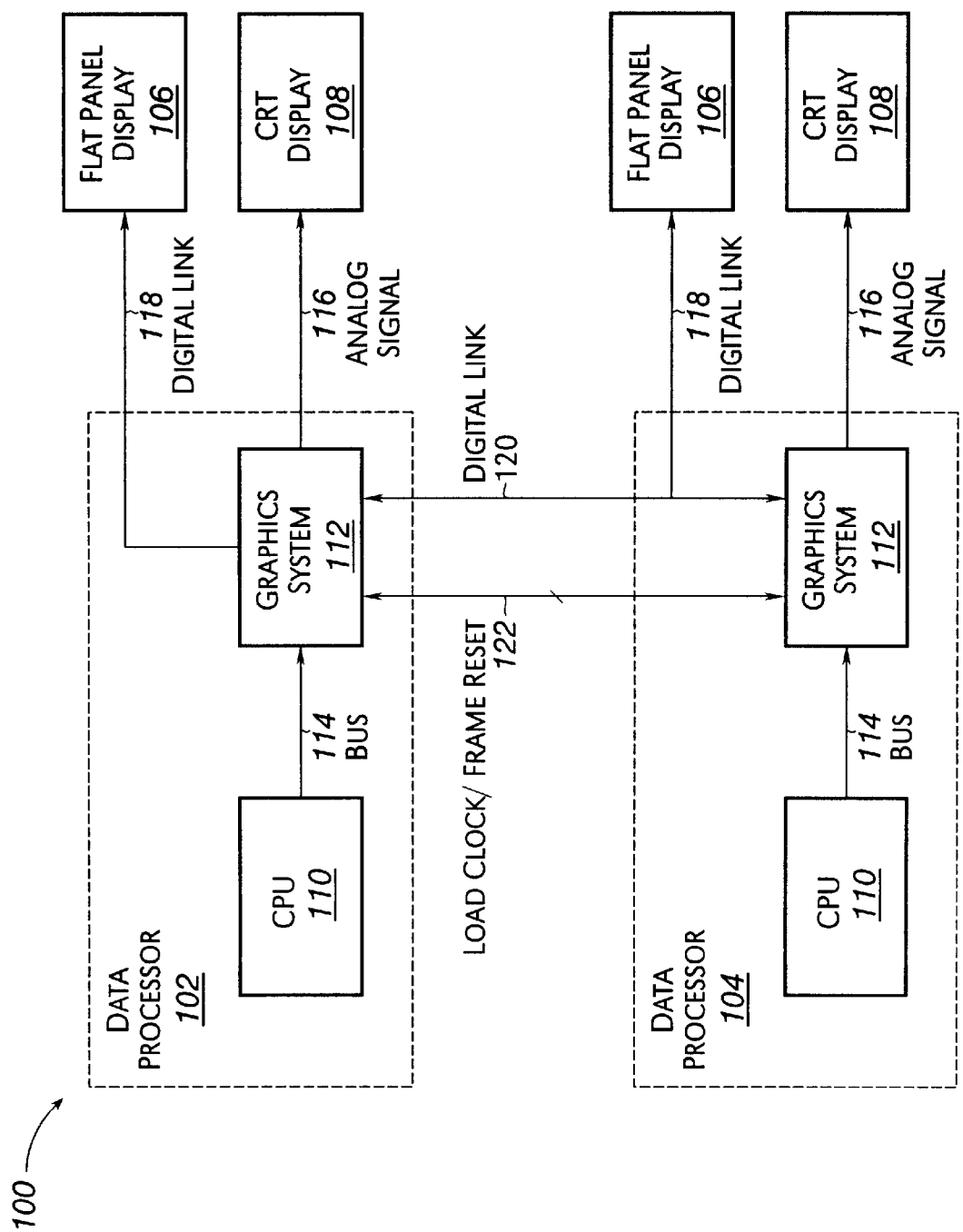
FIG. 1 illustrates, in block diagram form, a data processing system in accordance with an embodiment of the present invention.

A mechanism for merging pixel data is provided. A graphics system including a digital communications link interface receives graphical information from a central processing unit. The graphical information is provided to a graphics apparatus, which may be an application-specific integrated circuit (ASIC). The ASIC may be configurable as a master, a slave, or as a standalone device. The ASIC includes circuitry for rasterizing the graphical information. Additionally, when configured as a master device, the ASIC, via the digital data link, is operable for receiving graphics data from an ASIC configured as a slave. The master configured ASIC drives a graphical display device. Conversely, an ASIC configured as a slave is operable for communicating graphical data to an ASIC configured as a master. A master ASIC also provides clocking and control signals to a slave configured ASIC.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring now to FIG. 1, there is illustrated a data processing system 100 for generating graphical displays, in accordance with the present invention. System 100 includes first and second data processors, data processor 102 and data processor 104, which generate graphical images for display on a selected graphical display which may include one of flat panel displays 106 or cathode ray tube (CRT) displays 108. Data processors 102 and 104 may be embodied as stand-alone processors, or alternatively as processors constituting a multiprocessor (MP) data processing system 100.

Each of data processors 102 and 104 includes a central processing unit (CPU) 110 which generates the graphical images to be displayed, in accordance with a software program being executed by each of CPUs 110, as would be understood by an artisan of ordinary skill in the art. Additionally, CPU 110 includes an operating system to control the components of data processors 102 and 104, which operating system typically includes drivers for graphics hardware, such as graphics system 112. Image information is sent to graphics system 112 which converts the information into a form suitable for display on the selected display device, such as a flat panel display 106 or a CRT display 108. Graphics information is communicated from a CPU 110 to a graphics system 112 via a bus 114. Bus 114 may, in an embodiment of the present invention, be a Peripheral Component Interface (PC) bus. The PCI bus is a standard bus known in the data processing art. (See PCI Local Bus Specification, Revision 2.1, Jun. 1, 1995, copyright PCI Special Interest Group, which is hereby incorporated herein by reference.) Alternatively, bus 114 may be an Accelerated Graphics Port (AGP) bus. AGP is also a bus architecture known in the data processing art. (See, e.g., AGP Interface Specification, Revision 2.0, May 4, 1998, copyright Intel Corporation, hereby incorporated herein by reference.) Additionally, bus 114 may communicate control information to graphics system 112.

Graphic system 112 sends pixel data for display on one of flat panel display 106 or CRT display 108 formatted in accordance with the requirements of the display type. If a CRT display, such as one of CRT display 108, is selected, pixel data is sent for display using an analog RGB color signal, analog signal 116. Pixel data for flat panel displays, such as flat panel display 106 is provided in a digital format via digital link 118. In an embodiment of the present invention, digital link 118 may be a Transition Minimized Differential Signaling (TMDS™) interface architecture, such as PanelLink™ Digital, supplied by Silicon Image, Inc. Additionally, pixel data may be communicated between graphic systems 112 in each of data processor 102 and data processor 104 via a digital link 120. For example, one of graphics systems 112 may be configured as a master, and the other system 112 may be configured as a slave. Pixel data may be communicated on digital link 120 from the slave system to the master system. Slave data may be combined with native graphics data in the master system and displayed by the master system on the selected one of flat panel display 106 or CRT display 108. Digital link 120 may also be a TMDS™ architecture graphics link, such as PanelLink™ Digital. Additionally, the synchronization of slave pixel data and master pixel data is maintained by communicating load clock/frame reset signals 122 between the master configured graphics system 112 and the slave configured graphics system 112.

Figure 2:
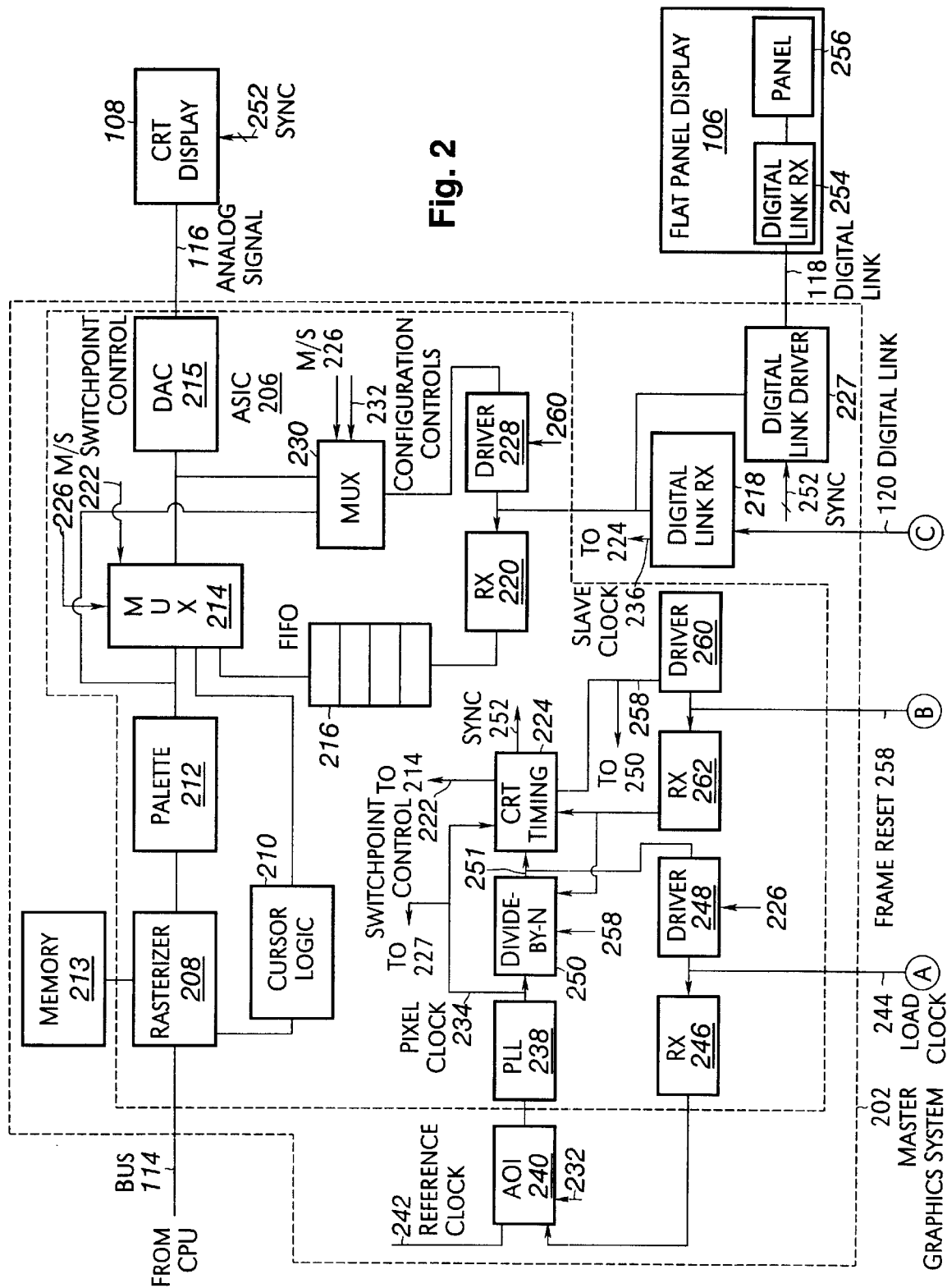
FIG. 2 illustrates, in block diagram form, a pixel data merge apparatus in accordance with an embodiment of the present invention.

The communication of pixel data between data processors configured, respectively, as a master and slave may be further understood by referring now to FIG. 2. FIG. 2 illustrates a portion 200 of data processing system 100, FIG. 1, in which portion 200 includes master graphics system 202 and slave graphics system 204. Each of master system 202 and slave system 204 include a configurable ASIC 206. In response to a plurality of control signals, ASIC 206 may be configured as a master device, or as a slave device. The control signals and their operation in configuring ASIC 206 will be discussed in detail in conjunction with FIG. 3, hereinbelow. It would be understood that ASIC 206 may be implemented as a single chip device or, in an alternative embodiment, may be implemented in a plurality of integrated circuit chips.

Each ASIC 206 contains a graphics engine which includes a rasterizer 208, cursor logic 210, and color palette 212. Rasterizer 208 takes high level commands from the software running on the associated CPU, such as CPU 110 in FIG. 1, and generates the pixel data for display. Pixels are written to memory 213, which may commonly be referred to as a frame buffer. Memory 213 is typically implemented off of the ASIC 206, however, it would be understood by an artisan of ordinary skill in the art that memory 213 could be, in an alternative embodiment, be provided within the ASIC 206. Cursor logic 210 generates hardware cursors and overlays, commonly referred to as "sprites", for display on the selected one of flat panel display 106 and CRT display 108. Palette 212 generates pixel color information. The operation of rasterizer 208, cursor logic 210, palette 212 and memory 213 are in accordance with principals known in the graphics processing art.

Pixel data generated by rasterizer 208, palette 212, and cursor 210 are input to multiplexer (MUX) 214. Additionally, an input of MUX 214 receives pixel data output by first-in-first-out (FIFO) buffer 216. FIFO 216, in master system 202 receives pixel data generated by rasterizer 208 and palette 212, in slave system 204. This pixel is communicated over digital link 120, and received by digital link receiver (RX) 218, in master system 202. As previously described, digital link 120 may be a serial digital link, such as PanelLink™ digital. In such an embodiment of the present invention, digital link receiver 218 is a PanelLink™ receiver, which recovers the digital pixel data transmitted by slave system 204 from the serial signal on digital link 120. An output of digital link receiver 218 is coupled to receiver 220, which drives FIFO 216. Receiver 220 may be operable for switching in response to control signals for configuring the ASIC 206. These signals are not illustrated in FIG. 2 for simplicity, however, these will be described in detail in conjunction with FIG. 3.

In response to switchpoint control 222, MUX 214 selects for outputting pixel data from FIFO 216, or, native pixel data from the associated rasterizer 208 and palette 212. Switchpoint control 222 is generated by CRT timing unit 224, also described in conjunction with FIG. 3, hereinbelow. Additionally, MUX 214 also receives master/slave (M/S) signal 226. When ASIC 206 is in a master configuration, as in master system 202, M/S 226 has a first predetermined value, and in response thereto, MUX 214 adds cursor pixel data, generated by hardware cursor logic 210, to the pixel data output by MUX 214. MUX then outputs merged pixel data in response to switchpoint control 222. MUX 214 drives CRT display 108 via digital-to-analog convertor (DAC) 215.

Pixel data output by ASIC 206 configured as a slave device, as in slave system 204, is transmitted over digital link 120 from digital link driver 227. Digital link driver 227 receives pixel data via driver 228, and converts the data to a signal format compatible with digital link 120. In an embodiment of the present invention in which link 120 is a PanelLink™ Digital link, signals on line 120 may be formatted in accordance with the TMDS™ specification.

The pixel data output by driver 228 is received from an output of MUX 230. MUX 230 selects pixel data for outputting from the output of MUX 214 and pixel generated by rasterizer 208 and palette 212. MUX 230 selects for outputting in response to a plurality of control signals, collectively, configuration control signals 232. Configuration control signals 232 include a plurality of data values which configure the graphics system, such as master system 202 and slave system 204. When configured as a slave device, as in slave system 204, MUX 230 selects for outputting pixel data generated by rasterizer 208 and palette 212, in the slave ASIC, such as ASIC 206 in slave system 204. MUX 230 selects between inputs in response to configuration control signals 232. Additionally, driver 228 is also switchable in response to a subset of the configuration control signals 232, and in response to switchpoint control 222. For simplicity, these are not shown in FIG. 2, however, will be described in detail in conjunction with FIG. 3.

In addition to pixel data received via driver 228, digital link driver 227 receives pixel clock 234. Digital link driver 227 also sends pixel clock 234 to digital link receiver 218, along with the pixel data formatted in accordance with the specification of digital link 120. Digital link receiver 218 recovers this pixel clock and outputs it on slave pixel clock 236. Slave pixel clock 236 is used in the master system to clock in the pixel data transmitted via digital link 120 from digital link driver 227, via receiver 220 into FIFO 216. This is also described in detail in conjunction with FIG. 3.

Pixel clock 234 is generated via phase lock loop (PLL) 238. A reference frequency for PLL 238 is supplied via AND-OR-INVERT (AOI) logic 240. When a graphics system is configured as a master, such as master system 202, AOI 240 outputs reference clock 242 to PLL 238. Conversely, when the graphics system is configured as a slave, such as graphics system 204, AOI 240 outputs load clock 244 derived from pixel clock 234 in the master system. Load clock 244 is provided to AOI 240 via receiver 246. In an ASIC configured as a slave device, receiver 246 receives load clock 244 from the master device. Thus, when ASIC 206 is configured as a master, as in master system 202, load clock 244 is provided to the slave system via driver 248. Driver 248 receives M/S 226 which renders driver 248 active in a master-configured ASIC. Conversely, in a slave device, M/S 226 places driver 248 in an inactive state.

Load clock 244 has a frequency that is a submultiple of pixel clock 234, and is derived from pixel clock 234 by dividing pixel clock 234 by a predetermined integer, N in divide-by-N 250. In an embodiment of the present invention, N may be eight (8). Load clock 244, having a frequency that is a submultiple of the frequency of pixel clock 234, effects synchronization of slave system 204 and master system 202 while mitigating the complications associated with distributing a high frequency signal such as the pixel clock itself. Output 251 of divide-by-N 250 is also input to CRT timing circuit 224 as a basic unit of time for CRT timing unit 224.

CRT timing unit 224 also generates horizontal and vertical synchronization ("sync") signals for the video displays, such as flat panel display 106 and CRT display 108. Horizontal and vertical sync signals are included in sync 252 output by CRT timing unit 224, and provided to CRT display 108, and digital link driver 227. Digital link driver 227 incorporates sync 252 in the signals communicated over digital link 118 to flat panel display 106, and the horizontal and vertical sync signals are recovered therefrom by digital link receiver 254, which provides them to panel 256.

The occurrence of a vertical sync signal also indicates the start of a video frame. CRT timing unit 224 also, at the start of a frame, asserts frame reset 258, which resets divide-by-N logic 250. Frame reset 258 is also provided by a master ASIC, such as ASIC 206 in master system 202, via driver 260 to an ASIC 206 configured as a slave device, such as ASIC 206 in slave system 204. Driver 260 is active when M/S 226 is in a logic state configuring the corresponding ASIC 206 as a master device. Frame reset 258 is received by receiver 262, an output of which provides frame reset 258 to CRT timing unit 224 and divide-by-N logic 250. In a slave ASIC, such as ASIC 206 in slave system 204, receiver 262 is rendered active in response to M/S 226 having a predetermined logic state configuring ASIC 206 as a slave device. Conversely, in the master ASIC, receiver 262 is inactive.

Figure 3:
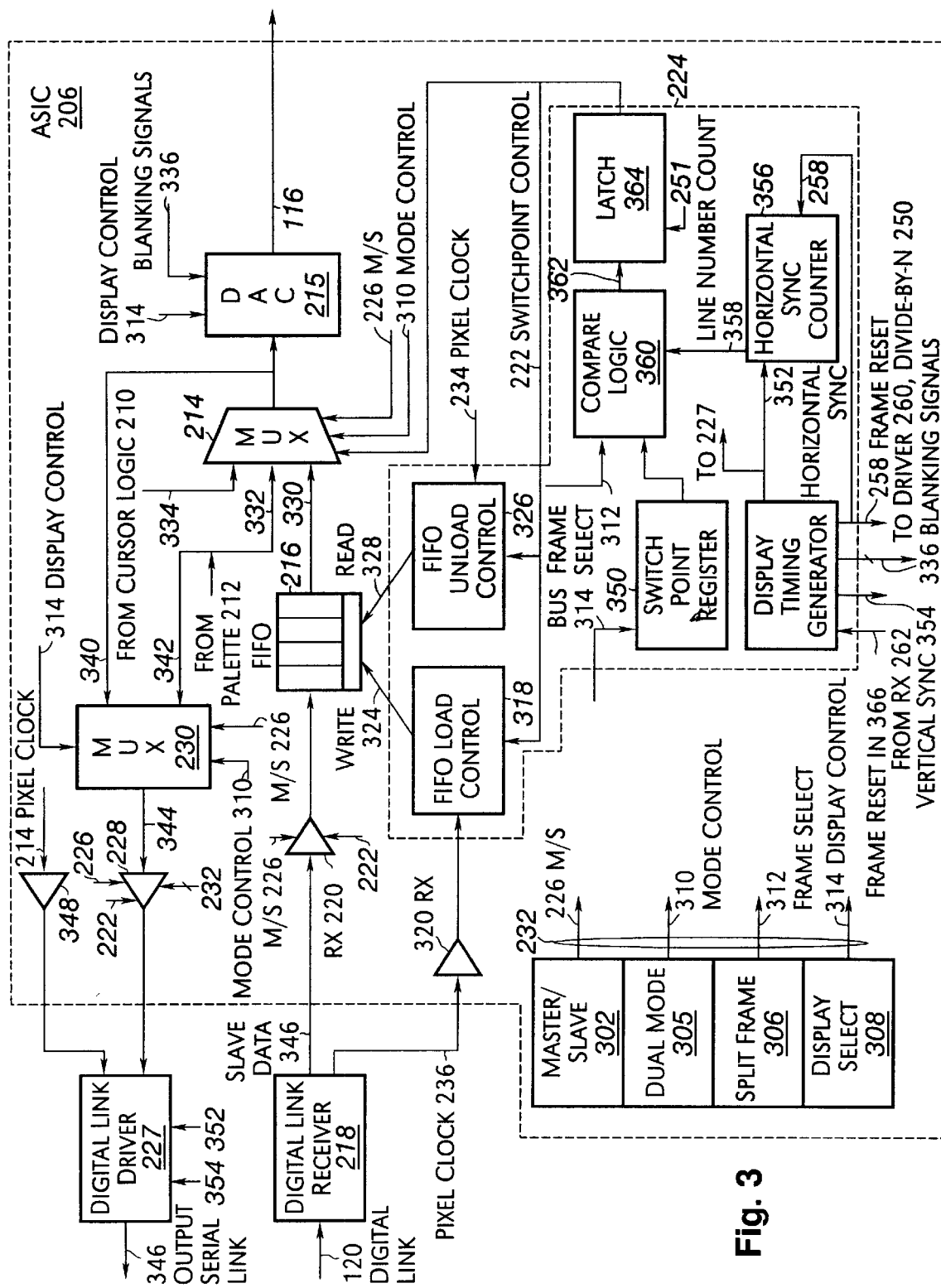
FIG. 3 illustrates, in further detail, a pixel data merge apparatus in accordance with an embodiment of the present invention.

The operation of ASIC 206, and, in particular, configuration control ASIC 206 may be further understood by referring to FIG. 3. FIG. 3 illustrates in further detail a portion of graphics system 112, FIG. 1. ASIC 206 includes four registers for receiving and holding control values. Master/slave register 302 contains a data value having a first predetermined value that configures ASIC 206 as a master device, and a second predetermined value that configures ASIC 206 as a slave device. M/S 226 outputs the value from master/slave register 302. Dual mode register 304 contains a control signal having a first predetermined value that configures ASIC 206 as a standalone device, and a second predetermined value that enables ASIC 206 to be configured as a master device or a slave device in accordance with the data value in master/slave register 302. Mode control 310 outputs the data value from dual mode register 304. Split frame register 306 holds a data value that determines when a switch between master sourced pixel data and slave sourced pixel data occurs. When split frame register 306 contains a first predetermined data value, switching occurs at the end of a complete frame, during a vertical blank interval. As is understood in the display processing art, the vertical blank interval is the time interval during which the display scan returns from a bottom of the display to a top of the display, and in which interval the display mechanism is suppressed to prevent artifacts associated with the scan retrace from appearing on the display. When split frame register 306 contains a second predetermined value, switching occurs within a frame, which may be set to a preselected line number, as will be described below. During split frame operation, switching occurs during a horizontal blank interval. As is understood in the display processing art, the horizontal blank interval occurs at an end of a scan line, during which time the display mechanism is suppressed while the scan returns to a start of a next scan line. A data value in split frame register 306 is output on frame select 312. Display select 308 includes a data value operable for configuring ASIC 206 to drive either a flat panel display, such as flat panel display 106, FIG. 1, or a CRT display, such as CRT display 108 in FIG. 1. The data value contained in display select register 308 is output on display control 314. Collectively, M/S 226, mode control 310, range select 312, and display control 314 constitute configuration control signals 232. Master/slave register 302, dual mode register 304, split range register 306, and display select register 308 may be addressed on bus 114, and data values thereby written to the corresponding one of registers 302–308.

As previously discussed in conjunction with FIG. 2, when data processing system 100 in FIG. 1, is configured as a master/slave system, such as system 200 in FIG. 2, slave pixel data is communicated via digital link 120 to digital link receiver 118. Slave pixel data is recovered from the signal communicated on digital link 120 in accordance with the corresponding protocol, and output on slave data 316. Additionally, pixel clock 234, FIG. 2 is incorporated in the signal on digital link 120, and also recovered by digital link receiver 218, and output as slave pixel clock 236. Slave data 316 is provided to receiver 220 which drives FIFO 216. Receiver 220 may be controlled by switchpoint control 222, and M/S 226. Switchpoint control 222 has a first predetermined value when native pixel data is being output to a display device, and a second predetermined value when slave pixel data is being output to the display device. In an embodiment of the present invention, the first predetermined value may be logic "0", and the second predetermined value may be logic "1", however, it would be understood by an artisan of ordinary skill that a complementary embodiment would be within the spirit and scope of the present invention. Receiver 220 is active when switchpoint control 222 has the logic state indicating slave data is active, and ASIC 206 is configured as a master device in response to the corresponding logic state of M/S 226.

FIFO load control 318 controls the writing of slave pixel data into FIFO 216. FIFO load control 318 receives slave pixel clock 236 via receiver 320. Slave pixel clock 236 informs FIFO load control 318 when valid slave pixel data is available on slave data 316 and consequently, at an output of receiver 220. Additionally, FIFO load control 318 receives switchpoint control 222. FIFO 216 is loaded after the switchpoint, wherein switchpoint control 222 switches from the first data value to the second data value. When switchpoint control 222 toggles from the first data value to the second data value, FIFO load control 318 enables write 324. Concomitantly, FIFO unload control 326 enables read 328, and slave pixel data may be unloaded from FIFO 216.

FIFO 216 is unloaded in response to pixel clock 234, native to ASIC 206 serving as the master device. Although slave pixel clock 236 is frequency locked to pixel clock 234 via load clock 244, as described in conjunction with FIG. 2, the slave pixel clock 236 is not phase locked to pixel clock 234 due to, inter alia, skew from path lengths between the master system and the slave system, such as master system 202 and slave system 204 in FIG. 2. Because these path lengths may be different, in different physical embodiments of the present invention, the phase between slave pixel clock 236 recovered by digital link receiver 218, and pixel clock 234, native to ASIC 206 may also differ between physical embodiments of system 100, FIG. 1, in which data processor 102 and data processor 104 are in a master/slave configuration. The use of FIFO 216, and unloading FIFO 216 with pixel clock 234 permits the switching between native pixel data and slave pixel data to occur within a single pixel clock resolution.

Pixel data output from FIFO 216 is provided to input 330 in MUX 214. Additionally, MUX 214 receives native pixel data from rasterizer 208 and palette 212, on input 332. When switchpoint control 322 has the first predetermined value, MUX 214 selects for outputting native pixel data on input 332. When switchpoint control 222 toggles to the second predetermined value, indicating slave data is active, MUX 214 selects for outputting the slave data on input 330 from MUX 214. Additionally, MUX 214 receives M/S 226 and mode control 310. If mode control 310 has the data value configuring ASIC 206 in standalone mode, MUX 214 suppresses selection of pixel data on input 330, independent of the logic state of switchpoint control 222. MUX 214 also receives native cursor pixel data from cursor logic 210, on input 334. If ASIC 206 is in standalone mode, as determined by the state of mode control 310, or is configured as a master device, in accordance with the state of M/S 226, MUX 214 adds native cursor pixel data to the output data stream. In other words, if ASIC 206 is configured as a master device in accordance with the state of M/S 226, the master device provides a hardware cursor overlying both native pixel data and slave pixel data. The output pixel data stream from MUX 214 is provided to DAC 215 which supplies analog display information to CRT display 108 via analog signal 116. Additionally, DAC 215 receive display control 314, and if display control 314 has the data value selecting for driving a flat panel display, DAC 215 is rendered inactive. Additionally, DAC 215 receives blanking signals 336 from display timing generator 338, which include horizontal and vertical blanking information. Blanking signals 336 disable DAC 215 during the horizontal and vertical blanking intervals, previously described.

The output data stream from MUX 214 is also provided to input 340 in MUX 230. MUX 230 also receives native pixel data from rasterizer 208 and palette 212 on input 342. MUX 230 selects for outputting the data on input 340 and the data on input 342 in response to M/S 226, mode control 310, and display control 314. MUX 230 selects for outputting the data on input 342 if M/S 226 configures ASIC 206 as a slave device. If mode control 310 and display control 314 have data values configuring ASIC 206 as a standalone device, and selecting for driving a flat panel display, such as flat panel display 106 in FIG. 1, then MUX 230 selects for outputting data on input 340. Otherwise, output 344 of MUX 230 is inactive. That is, if ASIC 206 is driving a flat panel display in standalone mode, MUX 230 outputs the data stream on input 340 including cursor data. Otherwise, MUX 230 outputs slave data or is inactive depending on the state of M/S 226.

Output 344 is coupled to digital link driver 227 via driver 228. Driver 228 receives configuration control signals 232 and switchpoint control 222. Driver 228 may be controlled by M/S 226 and switchpoint control 222. If M/S 226 has the logic state configuring ASIC 206 as a slave device, driver 228 is enabled, and is active when switchpoint control 222 has the logic state, indicating slave data is active. The slave data output by driver 228, when active, is formatted by digital link driver 227 in accordance with the specification for output digital link 346, which in an embodiment of the present invention may be a PanelLink™ Digital link. Additionally, driver 228 is active if ASIC 206 is configured as a standalone device driving a flat panel display. If ASIC 206 is configured as either a standalone device or a master device and configured to drive a flat panel display, such as flat panel display 106 in FIG. 1, output digital link 346 may constitute digital link 118 in FIG. 1. Conversely, if ASIC 206 is configured as a slave device, output link 346 may constitute digital link 120 in FIG. 1. Digital link driver 227 also receives pixel clock 234 via driver 348. Pixel clock 234 is incorporated in the digital link signals on output digital link 346 by digital link driver 227.

Switchpoint control 222 is generated in CRT timing unit 244. A horizontal line number is stored in switchpoint register 350. Switchpoint register 350 may be addressed on bus 114 and a data value corresponding to a preselected horizontal line may thereby be input to switchpoint register 350. Display timing generator 338 generates horizontal sync signal 352 and vertical sync signal 354 for synchronizing the displays, as previously discussed. Signals 352 and 354 collectively constitute sync 252, FIG. 2. Sync signals 352 and 354 are provided to digital link driver 227, which incorporates them into the signal on output digital link 346 in accordance with the specification thereof, for example the PanelLink™ TMDS™ interface standard. Additionally, horizontal signal 352 is provided to horizontal sync counter 356. Horizontal sync signal 352 increments horizontal sync counter 356, which then contains a horizontal line number count. Line number count 358 is provided to compare logic 360, which also receives the contents of switchpoint register 350. If frame select 312 has the logic state corresponding to split frame mode operation, compare logic 360 asserts output 362 when line number count 358 reaches the value stored in switchpoint register 350. Otherwise, if frame select 312 corresponds to complete frame mode, compare logic 360 asserts output 362 when line number count 358 reaches a predetermined count value representing a last line in the frame. The value on output 362 is held in latch 364, an output of which provides switchpoint control 222. Latch 364 holds the switchpoint signal after horizontal sync counter 256 advances and the output of compare logic 360 switches state in response. Latch 346 is clocked by output 251 of divide-by-N 250, which resets latch 346 at the end of a frame.

Display timing generator 338 also provides frame reset 258 to horizontal sync counter 356, resetting sync counter 356 at the end of the frame. Frame reset 258 is provided to driver 260, and divide-by-N 250, FIG. 2. If ASIC 206 is configured as a slave, the frame reset signal is provided by the associated master device, and is received on frame reset 366 from receiver 262.

Refer now to FIG. 4, illustrating a data processing system 400 in accordance with an alternative embodiment of the present invention. System 400 includes data processors 402, 404 and 406. Data processor 402 may have a graphics system 408 configured as master, and data processors 404 and 406 may include graphics system 408 configured as a slave. Each of slave-configured systems 408 receive load clock/frame reset signals 122 from master system 408. A first digital link 420 communicates pixel data from slave system 408 in data processor 404, and a second digital link 422 provides pixel data from slave system 408 in data processor 406. The operation of digital links 420 and 422, as well as load clock/frame reset 122 is the same as discussed hereinabove in conjunction with FIGS. 2 and 3, illustrating an embodiment having a single slave device. However, graphics system 408 includes a second digital link receiver to accommodate the second digital link 422, ad additional switchpoint control circuitry.

Figure 5A:
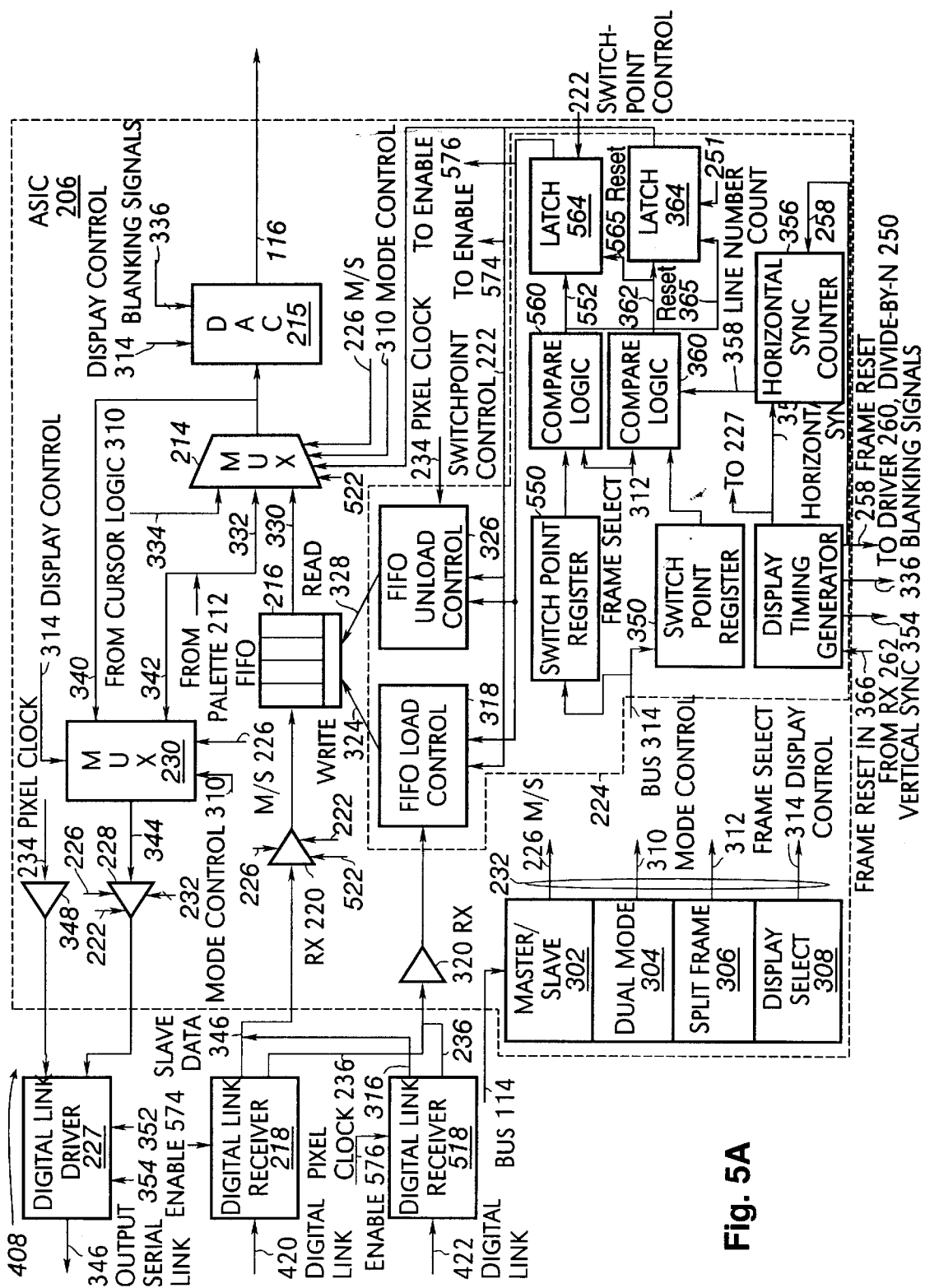
FIG. 5A illustrates, in further detail, a pixel data merge apparatus in accordance with the embodiment of FIG. 4.

This may be further understood by referring now to FIG. 5A illustrating a graphics system 408 in greater detail. A first digital link receiver 218 is coupled to digital link 420, and a second digital link receiver 518 is coupled to digital link 422. Slave data 316 outputs from each of the first and second receivers 218 are coupled in parallel to the input of receiver 220. Similarly, slave pixel clock 236 output from each of first and second receivers 218 is coupled to the input of receiver 320. The outputs of first and second receivers 218 are operable for switching to an inactive, high-impedance, state in response to an enable signal. Thus, the parallel connection of the outputs from each of first and second receivers 218 form a wired-OR logic function. In the embodiment of FIG. 5A, receiver 218 is controlled by enable 574 and receiver 518 is controlled by enable 576.

Switchpoint control signals switch MUX 214 when slave data is active. Switchpoint control 222 is generated as previously described in conjunction with FIGURE 3. A second switchpoint control signal, switchpoint control 522 is generated at the output of latch 564, which latches the output of compare 560. Switchpoint control 522 is generated in response to line number count 358 and a line number data value stored in switchpoint register 550 in analogous fashion to the generation of switchpoint control 222, previously discussed in conjunction with FIG. 3. MUX 214 selects for outputting data on input 330 when either or both of switchpoint controls 222 and 522 are active.

Switchpoint controls 222 and 522 are also input to enables 574 and 576, respectively. To ensure that both of receivers 218 and 518 are not simultaneously enabled, output 562 of compare 560 is provided to reset 365 in latch 364. Likewise, output 362 of compare 360 is input to reset 565 in latch 564. Thus, when output 562 becomes active, reset 365 resets latch 364, rendering switchpoint control 222 inactive. On the subsequent scan line, output 362 is negated, however, latch 364 holds switchpoint control 222 in the inactive state, although latch 364 may now be clocked by output 251 of divide-by-N 250, whereby switchpoint control 222 may again become active in a subsequent frame. Conversely, when output 362 of compare 360 becomes active, reset 565 resets latch 564, rendering switchpoint control 522 inactive. When output 362 is negated on the next scan line, latch 562 holds switchpoint control 522 inactive. However, latch 564 may be clocked by output 251, and switchpoint control 522 may likewise become active in a subsequent frame.

Additionally, switchpoint controls 222 and 522 are provided to FIFO load control 318 and FIFO unload control 326. If either switchpoint control 222 or 522 is active, signaling that slave data from either slave system is active, then load control 318 and unload control 326 enable write 324 and read 328, respectively. Likewise, if either switchpoint control 222 or 522 is active, receiver 220, and driver 228 are rendered active.

Figure 5B:
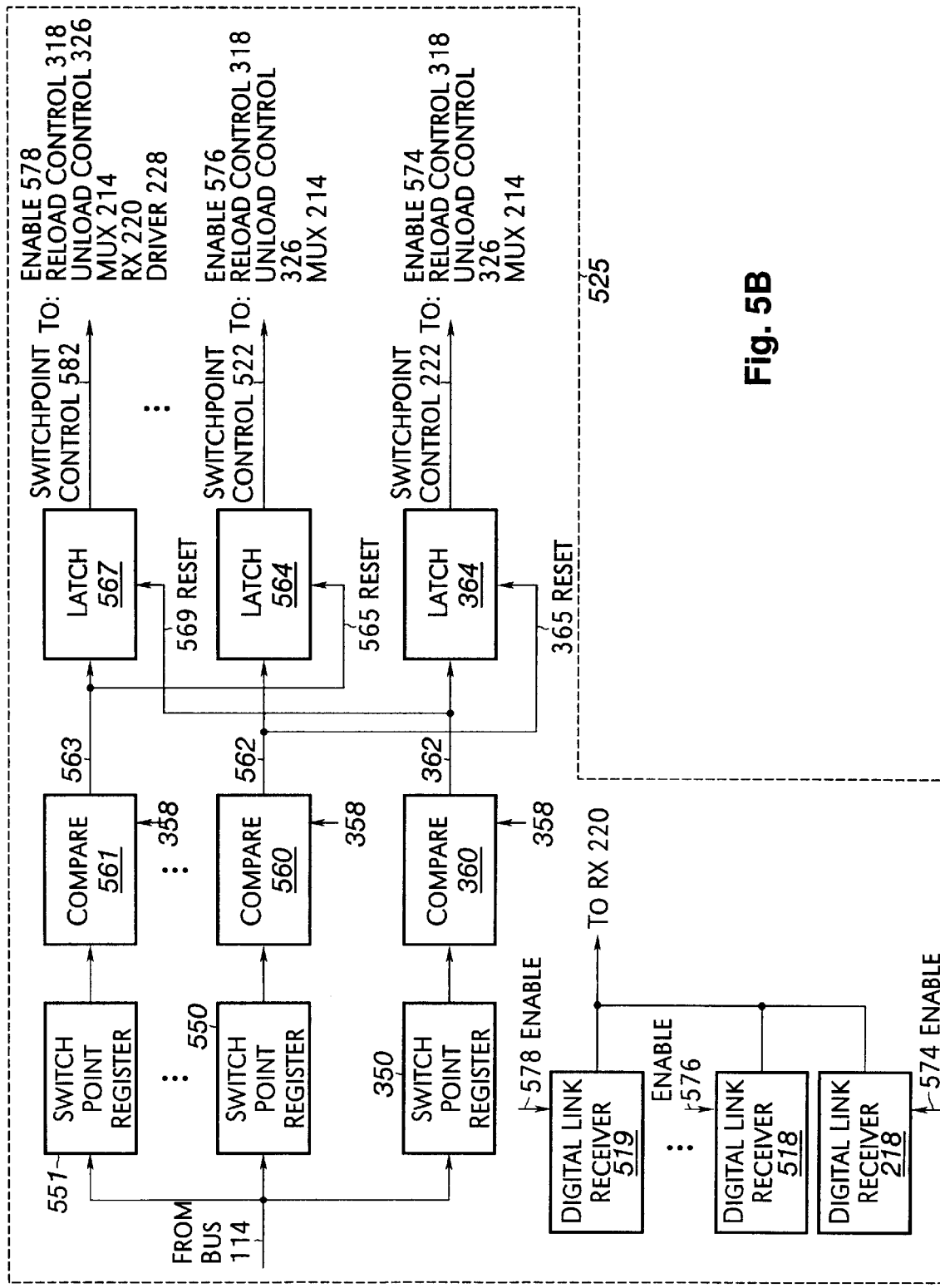
FIG. 5B illustrates a portion of a pixel data merge apparatus that may be used in an alternative embodiment of the pixel data merge apparatus of FIG. 5A.

Graphics system 408 in FIG. 5A may, in an alternative embodiment, be operable with a plurality of slave-configured systems. FIG. 5B illustrates a portion 525 which may be used in such an alternative embodiment of graphics system 408, for example system 408, FIG. 5A. Portion 525 includes a plurality, N, of digital link receivers, digital link receiver 218, 518, . . . , and 519. Each digital link receiver receives a corresponding enable signal, enable 574, enable 576, . . . , and enable 578. Additionally, portion 525 includes a plurality, N, of switch point registers, switchpoint register 350, 550, . . . , and 551, each of which is coupled to bus 114, and receives a corresponding scan line data value therefrom. The scan line number data value is provided to a corresponding one of a plurality and plurality, N, of compares 360, 560, . . . , and 561. Each of compares 360, 560, . . . , and 561 receives line number count 358 from horizontal sync counter 356 (horizontal sync counter 356 is not shown in FIGURE 5B, for simplicity.) Respective outputs 362, 562, . . . , and 563 of compares 360, 560, . . . , and 561 is provided to a corresponding latch, latch 364, 564, . . . , and 567, respectively. Each latch outputs one of a plurality, N, of switchpoint controls, switchpoint control 222, switchpoint control 522, . . . , switchpoint control 582. Each of the switchpoint controls is provided to a corresponding one of enables 574, 576, . . . , and 578. Additionally, switchpoint controls are coupled to reload control 318, unload control 326, MUX 214, receiver 220 and driver 228.

Each of latches 364, 564, . . . , and 567 is sequentially reset by one of the plurality, N, of outputs 362, 562, . . . , and 563. In the embodiment illustrated in FIG. 5B, reset 365 in latch 364 receives output 562. Similarly, reset 565 in latch 564 receives output 563, and reset 569 in latch 567 receives output 362. Thus, scan line number data values are loaded into switchpoint register 350, 550, . . . , and 551 in increasing order, by the software program being executed by a corresponding one of CPUs 110, FIG. 1, generating the graphics information as described in conjunction with FIG. 1. However, it would be understood by an artisan of ordinary skill that resets 365, 565, . . . , and 569 may be coupled to other permutations of outputs 362, 562, . . . , 563, with a corresponding perimutation of the ordering of scan line number data values stored in switchpoint registers 350, 550, . . . , and 551. It would be further understood that such alternative embodiments would be within the spirit and scope of the present invention.

Figure 5C:
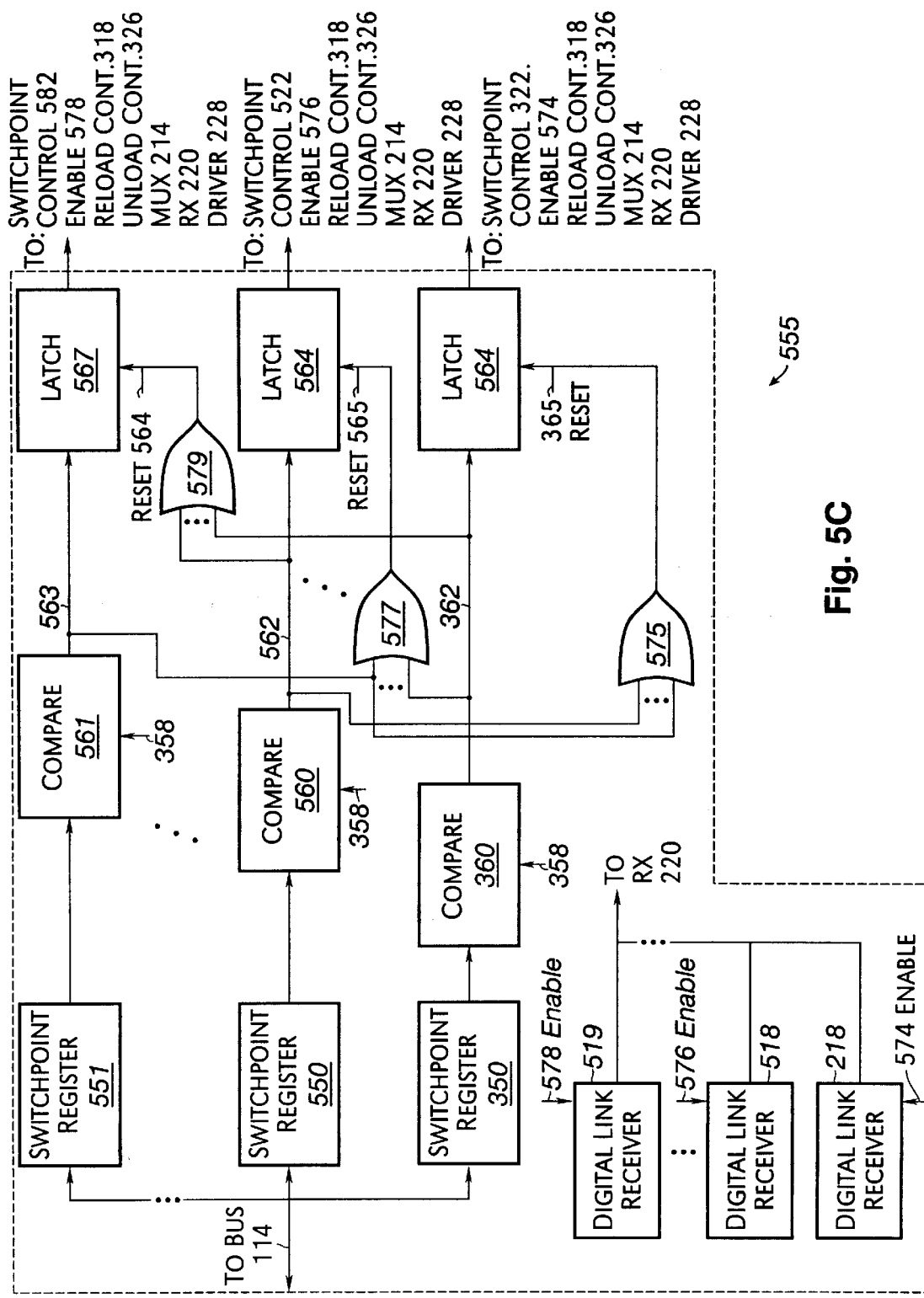
FIG. 5C illustrates a portion of a pixel data merge apparatus that may be used in another alternative embodiment of the pixel data merge apparatus of FIG. 5A.

FIG. 5C illustrates a portion 555 in accordance with an alternative embodiment in which scan line data values need not be stored in switchpoint registers 350, 550, . . . , and 551 in accordance with a predetermined ordering. Reset 365 and latch 364 is provided by an output of OR gate 575. OR gate 575 includes a plurality, N−1, of inputs, each of which is coupled to one of outputs 562, . . . , and 563. Similarly, reset 565 in latch 564 is coupled to an output of OR gate 577. The N−1 inputs of OR gate 577 are coupled to outputs 362, . . . , and 562. Latch 567 is reset by reset 569, which is coupled to an output of OR gate 579. The N−1 inputs of OR gate 579 are coupled to outputs 362, . . . , and 562. In other words, each of the plurality, N, of OR gates 575, 577, . . . , and 579 is coupled to an N−1 member subset of the set of N compare outputs and each such subset excludes the one of the N compare outputs coupled to the latch that is reset by the output of the corresponding OR gate. Otherwise, the operation of portion 555 is the same as portion 525 previously described in conjunction with FIG. 5B.

In this way, a pixel merge mechanism has been provided. An embodiment of the present invention includes a configurable ASIC, which may serve as a standalone graphics engine, or as a master or slave in a master/slave configuration. In standalone mode, the mechanism drives a display device with native pixel data. A device configured in master mode is operable for receiving pixel data from a corresponding slave device, and merging the slave pixel data with native pixel data generated by a rasterizer within the master ASIC. Data is communicated between slave and master using a digital data link, which may also serve to drive a flat panel display in standalone mode. A FIFO, active in the master, mediates the transfer of the slave pixel data and permits switching between native and slave pixel data with single pixel resolution. The FIFO accommodates slight differences in time between pixel in master device and slave pixel clock. Pixel data may be merged on a frame-by-frame basis, or in split frame mode wherein a first portion of the graphic shown on a display device constitutes native pixels generated in the rasterizer corresponding to the master device, and a second portion of the displayed graphic includes pixels generated by the rasterizer in the slave device.

Although the present invention and its advantages have been described in detail, it should be understood that various changes, substitutions and alterations can be made herein without departing from the spirit and scope of the invention as defined by the appended claims.

What is claimed is:

1. An apparatus for merging pixel data comprising:
   a buffer operable for receiving first pixel data from a first source;
   first selection circuitry operable for receiving said first pixel data from said buffer and second pixel data from a second source, wherein said first selection circuitry selects for outputting said first pixel data from said buffer and second pixel data received from said second source, said first selection circuitry being operable for outputting said first pixel and second pixel data to a display device, and wherein said buffer outputs said first pixel data in response to a first clock signal; and
   second selection circuitry operable for receiving said second pixel data from said second source and third pixel data from an output of said first selection circuitry, said second selection circuitry being operable for selecting for outputting said second pixel data from said second source and said third pixel data from said output in response to a set of control signals.

2. The apparatus of claim 1, wherein said buffer comprises a first-in-first-out (FIFO) buffer, and wherein said FIFO loads said pixel data in response to a second clock signal.

3. The apparatus of claim 2 wherein said second clock is derived from a pixel clock generated by said first source.

4. The apparatus of claim 1, wherein said first selection circuitry selects for outputting in response to a dynamic switch signal.

5. The apparatus of claim 1, wherein said first selection circuitry comprises a multiplexer (MUX).

6. The apparatus of claim 1 further comprising a digital data link receiver operable for receiving said first pixel data from said first source and outputting said first pixel data to said buffer.

7. The apparatus of claim 6 wherein said first pixel data is received in an encoded, serial format at an input of said digital link receiver, said receiver being operable for decoding said encoded format for outputting to said buffer.

8. The apparatus of claim 1 wherein said set of control signals includes a first control signal operable for selecting a display type, a second control signal operable for selecting between a master configuration and a slave configuration of said apparatus, and a third control signal operable for selecting a standalone mode of said apparatus.

9. The apparatus of claim 1 wherein said first source comprises a first graphics engine, and said second source comprises a second graphics engine.

10. The apparatus of claim 9 wherein said first graphics engine includes a first rasterizer operable for generating said pixel data and said second graphics engine includes a second rasterizer operable for generating said pixel data.

11. The apparatus of claim 1 further comprising a first driver operable for receiving an output from said second selection circuitry and outputting a signal on a digital data link.

12. The apparatus of claim 11 further comprising a second driver operable for receiving said output from said second selection circuitry and outputting said signal to said first driver, wherein an output of said second driver is operable for becoming inactive in response to a predetermined set of said plurality of control signals.

13. An apparatus for merging pixel data comprising:
   a buffer operable for receiving first pixel data from a first source;
   first selection circuitry operable for receiving said first pixel data from said buffer and second pixel data from a second source, wherein said first selection circuitry selects for outputting said first pixel data from said bugger and second pixel data received from said second source, said first selection circuitry being operable for outputting said first and second pixel data to a display device, and wherein said buffer outputs said first pixel data in response to a first clock signal;

circuitry operable for generating said first clock signal; and circuitry operable for outputting a second clock signal having a predetermined frequency ratio relative to said first clock signal, said second clock signal being operable for regenerating a third clock signal operable for loading pixel data from said first source into said buffer.

14. The apparatus of claim 13 further comprising circuitry operable for outputting a dynamic switching signal, wherein said dynamic switching signal is operable for selecting for outputting a portion of said second pixel data generated by said second source.

15. An apparatus for merging pixel data comprising:

a buffer operable for receiving first pixel data from said buffer and second pixel data from a second source, wherein said first selection circuitry selects for outputting said first pixel data from said buffer and second pixel data received from said second source, said first selection circuitry being operable for outputting said first and second pixel data to a display device, and wherein said buffer outputs said first pixel data in response to a first clock signal;

a first digital data link receiver operable for receiving said first pixel data from said first source and outputting said first pixel data to said buffer; and a second digital data link receiver operable for receiving third pixel data from a third source and outputting said third pixel data to said buffer.

16. The apparatus of claim 15 wherein said first and second digital data link receivers are operable for placing in an active state in response to first and second enable signals, respectively.

17. The apparatus of claim 16 further comprising:

first circuitry operable for outputting a first dynamic switching signal; and second circuitry operable for outputting a second dynamic switching signal, wherein said first and second signals comprise said first and second dynamic switching signals, respectively, and wherein said first selection circuitry selects for outputting in response to said first and second dynamic switching signals.

18. A method of merging pixel data comprising the steps of:

receiving first and second pixel data from first and second sources, respectively;

loading said second pixel data from said second source in a buffer; and selecting for outputting said first pixel data from said first source and said second pixel data stored in said buffer in response to a dynamic switch signal, and wherein said buffer outputs said stored second pixel data in response to a first clock signal, wherein said step of selecting for outputting further comprises the step of selecting, in response to a set of control signals, between said second pixel data from said second source and third pixel data selected in response to said dynamic switch signal.

19. The method of claim 18 wherein said buffer comprises a first-in-first-out (FIFO) buffer, and wherein said FIFO inputs said second pixel data in response to a second clock signal.

20. The method of claim 19 further comprising the step of deriving said second clock signal from a pixel clock generated by said first source.

21. The method of claim 18 wherein said step of receiving said first pixel data from said first source further comprises the step of communicating said first pixel data from said first source over a digital data link.

22. The method of claim 21 wherein said step of communicating said first pixel data comprises the steps of:

encoding said first pixel data using a predetermined format; and serially transmitting encoded first pixel data.

23. The method of claim 18 wherein said set of control signals includes a first control signal operable for selecting a display type, a second control signal operable for selecting between a master configuration and a slave configuration, and a third control signal operable for selecting a standalone mode.

24. The method of claim 18 wherein said first source includes a first graphics rasterizer and said second source includes a second graphics rasterizer.

25. A method of merging pixel data comprising the steps of:

receiving first and second pixel data from first and second sources, respectively;

loading said second pixel data from said second source in a buffer; and selecting for outputting said first pixel data from said first source and said second pixel data stored in said buffer in response to a dynamic switch signal, and wherein said buffer outputs said stored second pixel data in response to a first clock signal;

generating said first clock signal; and generating a second clock signal having a predetermined frequency ratio relative to a frequency of said first clock signal, said second clock signal being operable for regenerating a third clock signal operable for loading first pixel data from said first source into said buffer.

26. A method of merging pixel data comprising the steps of:

receiving first and second pixel data from first and second sources, respectively;

loading said second pixel data from said second source in a buffer; and selecting for outputting said first pixel data from said first source and said second pixel data stored in said buffer in response to a dynamic switch signal, and wherein said buffer outputs said stored second pixel data in response to a first clock signal;

receiving third pixel data from a third source;

loading said third pixel data into said buffer; and selectively enabling said first and third pixel data for loading into said buffer in response to first and second enable signal, respectively.

27. The method of claim 26 further comprising the steps of:

generating first and second dynamic switching signals in response to first and second preselected line numbers, respectively; and providing said first and second enable signals in response to said first and second dynamic switching signals, said first and second dynamic switching signals being operable for selecting for outputting portions of said second and third pixel data.

28. A data processing system comprising:

a central processing unit (CPU);

a graphics system operable for receiving graphics data signals and graphics control signals from said CPU, said graphics system comprising:

a buffer operable for receiving first pixel data from a first graphics engine;

a second graphics engine operable for generating second pixel data in response to said graphics data signals;

first selection circuitry operable for receiving said first pixel data from said buffer and said second pixel data from said second graphics engine, wherein said first selection circuitry selects for outputting said first pixel data from said buffer and second pixel data retrieved from said second graphics engine, said first selection circuitry being operable for outputting said first and second pixel data to a display device, wherein said buffer outputs said first pixel data in response to a first clock signal from said second graphics engine; and second selection circuitry operable for receiving said second pixel data from said second source and third pixel data from an output of said first selection circuitry, said second selection circuitry being operable for selecting for outputting said second pixel data from said second source and said third pixel data from said output in response to a set of configuration control signals derived from said graphics control signals.

29. The data processing system of claim 28 wherein said buffer comprises a first-in-first-out (FIFO) buffer, and wherein said FIFO loads said second pixel data in response to a second clock signal.

30. The data processing system of claim 29 wherein said second clock is derived from a pixel clock generated by said first graphics engine.

31. The data processing system of claim 28 wherein said set of configuration control signals includes a first control signal operable for selecting a display type for displaying said pixel data, a second control signal operable for selecting between a master configuration and a slave configuration of said apparatus, and a third control signal operable for selecting a standalone mode of said apparatus.

32. The data processing system of claim 28 wherein said graphics system further comprises circuitry operable for outputting a dynamic switching signal, wherein said dynamic switching signal is operable for selecting for outputting a portion of a set of pixel data generated by said graphics engine.

33. The data processing system of claim 28 wherein said second graphics engine includes a rasterizer for generating said pixel data in response to said graphics data signals.

34. A data processing system comprising:

a central processing unit (CPU);

a graphics system operable for receiving graphics data signals and graphics control signals from said CPU, said graphics system comprising:

a buffer operable for receiving first pixel data from a first graphics engine;

a second graphics engine operable for generating second pixel data in response to said graphics data signals;

first selection circuitry operable for receiving said first pixel data from said buffer and said second pixel data from said second graphics engine, wherein said first selection circuitry selects for outputting said first pixel data from said buffer and second pixel data retrieved from said second graphics engine, said first selection circuitry being operable for outputting said first and second pixel data to a display device, wherein said buffer outputs said first pixel data in response to a first clock signal from said second graphics engine;

circuitry operable for generating said first clock signal; and circuitry operable for outputting a second clock, said second clock signal being operable for regenerating a third clock signal operable for loading said first pixel data from said first graphics engine into said buffer.

35. A data processing system comprising:

a central processing unit (CPU);

a graphics system operable for receiving graphics data signals and graphics control signals from said CPU, said graphics system comprising;

a buffer operable for receiving first pixel data from a first graphics engine;

a second graphics engine operable for generating second pixel data in response to said graphics data signals;

first selection circuitry operable for receiving said first pixel data from said buffer and said second pixel data from said second graphics engine, wherein said first selection circuitry selects for outputting said first pixel data from said buffer and second pixel data retrieved from said second graphics engine, said first selection circuitry being operable for outputting said first and second pixel data to a display device, wherein said buffer outputs said first pixel data in response to a first clock signal from said second graphics engine;

a first digital data link receiver operable for receiving said first pixel data from said first graphics engine and outputting said first pixel data to said buffer; and a second digital data link receiver operable for receiving third pixel data from a third graphics engine and outputting said third pixel data to said buffer.

36. The data processing system of claim 35 wherein said first and second digital data link receivers are operable for placing in an active state in response to first and second enable signals, respectively.

37. The data processing system of claim 36 wherein said graphics system further comprises:

first circuitry operable for outputting a first dynamic switching signal; and second circuitry operable for outputting a second dynamic switching signal, wherein said first and second enable signals comprise said first and second dynamic switching signals, respectively, and wherein said first selection circuitry selects for outputting in response to said first and second dynamic switching signals.

* * * * *

UNITED STATES PATENT AND TRADEMARK OFFICE
CERTIFICATE OF CORRECTION

PATENT NO. : 6,483,503 B1  Page 1 of 1
DATED : November 19, 2002
INVENTOR(S) : John Fred Spannaus and John Alvin Voltin It is certified that error appears in the above-identified patent and that said Letters Patent is hereby corrected as shown below:

Column 12,
Line 63, please replace "bugger" with -- buffer --.

Signed and Sealed this

Twelfth Day of August, 2003

JAMES E. ROGAN
*Director of the United States Patent and Trademark Office*